Patented Oct. 28, 1952

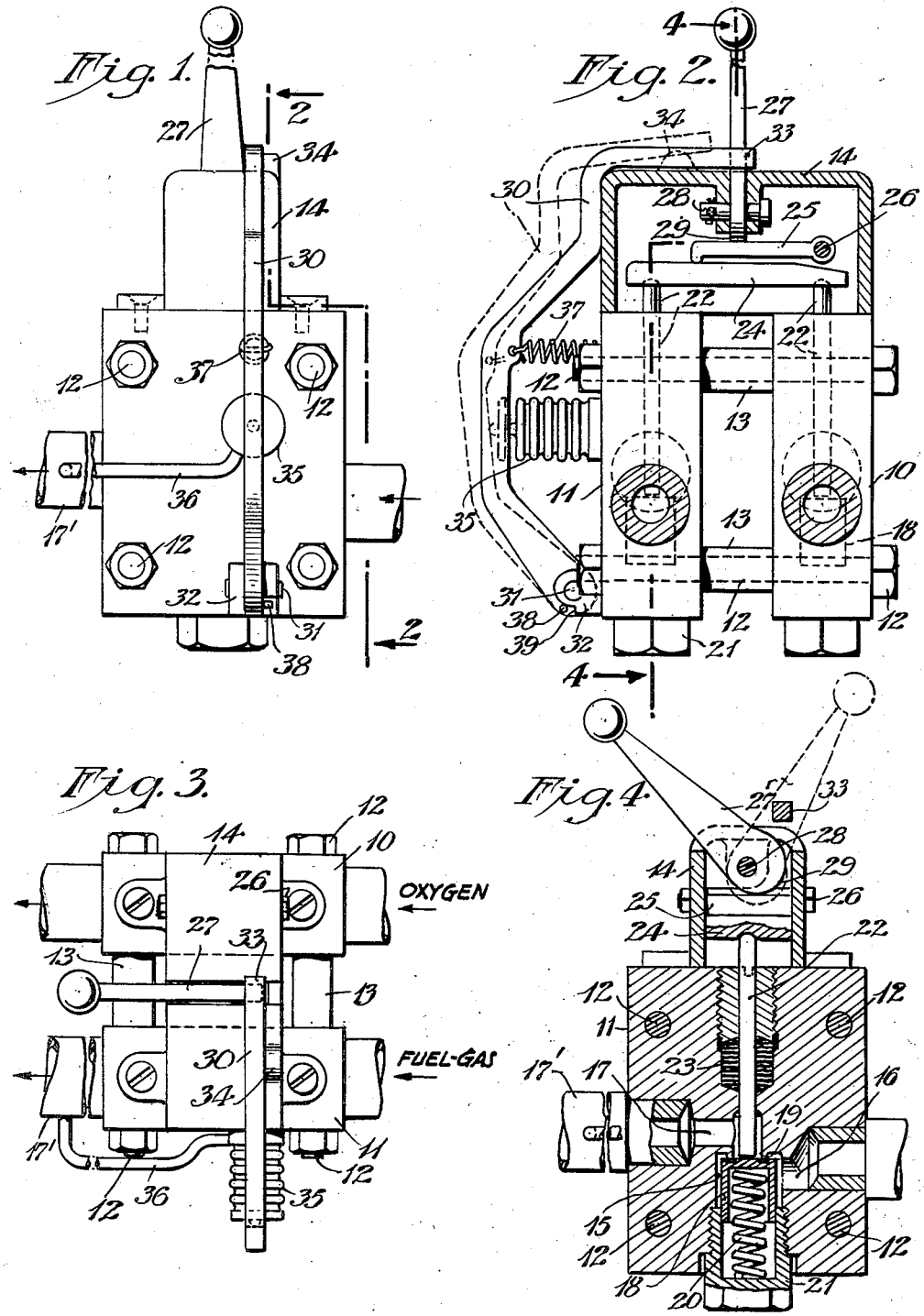

2,615,464

UNITED STATES PATENT OFFICE 2,615,464

SEQUENTIALLY OPERATED VALVE MECHANISM

Howard G. Hughey, Fanwood, N. J., assignor to Air Reduction Company, Incorporated, a corporation of New York Application June 26, 1946, Serial No. 679,395

4 Claims. (Cl. 137—87)

This invention relates to valves for controlling the flow of fluids, and more particularly to valves for controlling the supply of fuel-gas and oxygen to a gas torch.

Patent No. 2,337,659 to George L. Walker and myself, issued December 28, 1943, discloses valve mechanism comprising a composite valve unit made up of a pair of valves, an operating lever for the valves, and means whereby movement of the lever first opens one of the valves and thereafter opens the other valve. The valve mechanism was intended primarily for controlling the supply of fuel-gas and oxygen to gas torches. When so used, actuation of the operating lever through its successive positions first turns on the supply of fuel-gas and thereafter turns on the supply of oxygen, thus lessening the danger of flashbacks. Although the operating lever, when actuated, will always open the fuel-gas valve ahead of the oxygen valve, it is still possible for a flashback to occur if it is moved too quickly so that there is oxygen mixed with the fuel-gas in the torch before the flame jets are ignited.

The principal object of this invention is to make it impossible when operating valve mechanism of the kind shown in the above-mentioned patent, or valve mechanism operating on a similar principle, to move the operating lever, or other valve-actuating element, far enough to open the oxygen valve until the pressure of the fuel-gas, turned on by the initial movement of the operating lever, has built up to a predetermined value at the downstream side of the valve mechanism.

According to the invention valve mechanism of the kind referred to is provided with a blocking or interferring member which normally permits only sufficient movement of the valve actuating element to open the fuel-gas valve, and also means responsive to the pressure of the fuel-gas at the downstream side of the valve for moving the blocking element from its normal position, thereby permitting additional movement of the valve actuating element that opens the oxygen valve.

The accompanying drawing illustrates one form of the invention as applied to a composite valve unit, or dual valve block assembly, of the general type disclosed in the above-mentioned patent. In the drawing:

Figure 1 is a side elevation of such a dual valve block assembly to which the invention has been applied;

Fig. 2 is a transverse vertical section taken on the line 2—2 of Fig. 1;

Fig. 3 is a top plan view of the parts shown in Fig. 1; and

Fig. 4 is a longitudinal vertical section taken on the line 4—4 of Fig. 2.

The valve assembly shown in the drawing comprises two identical valve casings 10 and 11 (Figs. 2 and 3) clamped together by bolts 12. Spacer sleeves 13 surrounding the bolts 12 hold the valve casings at the desired distance from each other. A housing 14 bolted to the top of the valve casings encloses some of the parts of the valve actuating mechanism to be hereinafter described.

A description of the parts within one of the valve casings will suffice for the other since they may be identical. Fig. 4 shows one of the valve casings in longitudinal section. Referring to this figure, there is a central valve chamber 15 in communication with a gas inlet 16 and a gas outlet 17. A valve element 18 cooperates with a raised lip 19 which constitutes a valve seat. The valve element is urged against the seat by a spring 20 compressed between the valve element and a cap 21 that threads into the valve casing and closes the valve chamber. A valve rod 22 extends through the top wall of the valve casing, a stuffing box 23 being provided to prevent leakage of gas around the valve rod. The valve element 18 is unseated against the action of spring 20 by downward movement of the valve rod 22.

Within the housing 14 there is a floating bar 24 (Fig. 2) which spans the valve rods in the two valve casings and rests on the upper ends of the rods, there being recesses in the bottom face of the bar to receive the ends of the valve rods. The bar 24 is supported solely by the valve rods, and while it has clearance from the sides and ends of the housing 14, the housing prevents any substantial displacement of the floating bar either sideways or endwise. A lever 25 is fulcrumed at one end on a pin 26 that extends between the opposite walls of the housing 14. The free end of the lever 25 rests on the floating bar 24 at a region closer to the valve rod in casing 11 than to the valve rod in casing 10. This off-center loading of the floating bar 24 causes the left end of the bar (as viewed in Fig. 2) to be depressed first when the lever 25 is pushed down. In this first movement of the floating bar 24 the upper end of the valve rod in the casing 10 serves as a fulcrum for the floating bar. As the left end of the floating bar moves down it displaces the valve rod in the casing 11 and causes the valve element in this casing to move into open position. When the left end of the floating bar 24 strikes the top face of the valve casing 11, that end of the floating bar acts as a fulcrum, and as the lever 25 is pushed down farther it depresses the right end of the floating bar and displaces the valve rod in the casing 10 to move the valve element in this casing into open position.

An operating lever 27 is pivotally supported in the housing 14 on a pin 28. The operating lever has a cam surface 29 (see also Fig. 4) at its lower end which bears against the lever 25 and moves it downwardly as the operating lever is moved angularly about the axis of the pin 28 from the full line position shown in Fig. 4 to the dotted line position.

When the operating lever 27 is in the full line position shown in Fig. 4, lever 25 is in normal position and the valve elements in both valve casings remain closed. When the operating lever is moved to a substantially vertical position the lever 25 is pushed down and depresses the left end of the floating bar 24 (Fig. 2) in the manner above described to open the valve element in the casing 11. Movement of the operating lever to the dotted line position shown in Fig. 4 pushes the lever 25 farther down and causes the right end of the floating bar 24 to open the valve element in the casing 10.

If the valve in the casing 11 controls the supply of fuel-gas and the valve in the casing 10 controls the supply of oxygen, it will be seen that the initial movement of the operating lever 27 opens the fuel-gas valve and the final movement of the operating lever opens the oxygen valve. Actuation of the operating lever will therefore always open the fuel-gas valve ahead of the oxygen valve, but it is evident that if the operating lever is moved too quickly the oxygen valve may be opened so soon after opening of the fuel-gas valve that the danger of a flashback is not entirely eliminated. To prevent this from happening, I provide blocking means for preventing the operating lever from being moved beyond the position in which the fuel-gas valve is opened until the pressure of the fuel-gas on the downstream side of the valve builds up, and this pressure is utilized to remove the blocking means and then permit movement of the operating lever an additional amount to open the oxygen valve. The blocking means may be a pivoted arm of the kind shown at 30 in Figs. 1, 2 and 3. The arm is pivoted at its lower end by means of a pin 31 to a bracket 32 attached to the outer side of the valve casing 11. The blocking position of the arm 30 is shown in full lines in Fig. 2. In this position the extreme upper end 33 of the arm extends across the path of movement of the operating lever 27. A lug 34 acts to brace the upper end portion of the arm when sidewise thrust is exerted upon it by the operating lever. The end 33 of the arm 30 is located approximately at the midpoint of the travel of the operating lever 27, thus permitting the operating lever to move to this extent, i. e. from the full line position shown in Fig. 4 to its substantially vertical position shown in Fig. 1 to thereby open the fuel-gas valve, but preventing further movement of the operating lever until the end of the blocking arm is removed from its path of travel.

Fastened to the outer face of the valve casing 11 is an expansible bellows 35 so positioned as to be operable on the pivoted arm 30. The bellows communicates with the fuel-gas outlet conduit 17' at a suitable point downstream from the fuel-gas valve by means of tubing 36 (Figs. 1 and 3).

After the fuel-gas valve is opened some of the fuel-gas enters the bellows through the tubing and expands the bellows to move the blocking arm 30 outwardly about the axis of its pivot pin 31 to the dotted line position shown in Fig. 2. The outward movement of the pivoted arm is in opposition to a restraining spring 37 which returns the arm to blocking position when the fuel-gas valve is closed. Outward movement of the pivoted arm beyond the dotted line position shown in Fig. 2 may be restricted in any suitable way as by providing a pin or projection 38 at the lower end of the arm which comes in contact with a shoulder 39 on the bracket 32 after the pivoted arm has moved far enough for its end 33 to clear the path of travel of the operating lever 27.

It will now be seen that movement of the operating lever 27 from the position shown in Fig. 4 to its substantially vertical position opens the fuel-gas valve, but since the end of the pivoted arm 30 normally blocks the movement of the operating lever beyond its vertical position, the operating lever cannot be moved farther until the pressure of the fuel-gas on the downstream side of the fuel-gas valve builds up, whereupon this pressure is transmitted through the tubing 36 and expands the bellows sufficiently to move the pivoted arm 30 to its outward position, thereby moving the end portion of the arm out of the path of travel of the operating lever. The operating lever can then be moved farther to open the oxygen valve. The movement of the operating lever to the position in which the oxygen valve can be opened is therefore delayed until the danger of a flashback, such as might occur if the oxygen valve is opened too soon after opening of the fuel-gas valve, is practically eliminated.

While the invention in its preferred form is particularly adapted for controlling the supply of fuel-gas and oxygen to a gas torch, it may be used for controlling other gases that are to be turned on successively and where it is important that the valve controlling the second gas to be turned on is not opened too soon after opening of the valve that controls the first gas.

I claim:

1. Valve mechanism for the control of two different fluids comprising two valve casings, fastening means connecting the valve casings together to form a structural unit, a valve in each casing, means for passing the two different fluids independently and separately through the two casings, a common actuating element for the two valves, a blocking device having a portion which in the blocking position of the blocking device crosses the path of movement of said actuating element and allows movement of the actuating element only so far as to permit operation of the first valve, and a bellows expansibly responsive to the pressure of the fluid released by operation of the first valve for actuating the blocking device to move it from its blocking position and remove said portion from its blocking position thereby permitting further movement of the actuating element and opening of the second valve.

2. Valve mechanism for the control of two different fluids comprising two valve casings, fastening means connecting the valve casings together to form a structural unit, a housing extending across the top of said casings and connected thereto, a valve in each casing, means for passing the two different fluids independently and separately through the two casings, means for actuating the valves enclosed partly in said housing and including a common operating lever pivotally supported by the housing and projecting above the same where it may be manually operated, a blocking arm pivoted to the side wall of one of the valve casings and having an upper end portion projecting over said housing and which in the blocking position of the arm crosses the path of movement of said operating lever and allows movement of the operating lever only so far as to permit opening of the first valve, spring means biasing the blocking arm inwardly to its blocking position in which its upper end portion crosses the path of movement of the operating lever, and means responsive to the pressure of the fluid released by opening of the first valve for moving the blocking arm outwardly from its blocking position and moving its upper end portion from its lever-blocking position thereby permitting further movement of the operating lever and opening of the second valve.

3. Valve mechanism for the control of two different fluids comprising two valve casings, fastening means connecting the valve casings together to form a structural unit, a valve in each casing, means for passing the two different fluids independently and separately through the two casings, means for actuating the valves including a common operating lever pivotally mounted above the valve casings, and a blocking arm pivoted at its lower end to the side wall of one of the valve casings and having an upper end portion which in the blocking position of the arm crosses the path of movement of said operating lever and allows movement of the operating lever only so far as to permit opening of the first valve, spring means biasing the blocking arm inwardly to its blocking position in which its upper end portion crosses the path of movement of the operating lever, a bellows located between a portion of said blocking arm and that casing wall to which the arm is pivoted and expansibly responsive to the pressure of the fluid released by opening of the first valve for moving the blocking arm outwardly from its blocking position and moving its upper end portion from its lever-blocking position thereby permitting further movement of the operating lever and opening of the second valve, and stop means limiting the total outward movement of said blocking arm from its normal position.

4. Valve mechanism for the control of two different fluids comprising two valve casings, fastening means connecting the valve casings together to form a structural unit, a housing extending across the top of said casings and connected thereto, a valve in each casing, means for passing the two different fluids independently and separately through the two casings, means for actuating the valves enclosed partly in said housing and including a common operating lever pivotally supported by the housing and projecting above the same where it may be manually operated, a blocking arm pivoted to the side wall of one of the valve casings and having an upper end portion projecting over said housing and which in the blocking position of the arm crosses the path of movement of said operating lever and allows movement of the operating lever only so far as to permit opening of the first valve, spring means biasing the blocking arm inwardly to its blocking position in which its upper end portion crosses the path of movement of the operating lever, means responsive to the pressure of the fluid released by opening of the first valve for moving the blocking arm outwardly from its blocking position and moving its upper end portion from its lever-blocking position thereby permitting further movement of the operating lever and opening of the second valve, and a bearing block on said housing for bracing the upper end portion of the blocking arm against lateral movement when it is restraining further movement of the operating lever.

HOWARD G. HUGHEY.

REFERENCES CITED

The following references are of record in the file of this patent:

UNITED STATES PATENTS

| Number | Name | Date |
| --- | --- | --- |
| 1,775,427 | Gregoire | Sept. 9, 1930 |
| 1,973,115 | Shield | Sept. 11, 1934 |
| 2,337,659 | Hughey | Dec. 28, 1943 |